DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 2, 1971

883 O.G. 11

T883,015

SILVER HALIDE PRINTOUT PHOTOGRAPHIC MATERIALS

Robert D. Lindholm, Kodak Park Works, Rochester, N.Y. 14650

Filed June 1, 1970, Ser. No. 42,594
**Int. Cl. G03c *1/02***
U.S. Cl. 96—114.6
No Drawing. 9 Pages Specification

There are disclosed photographic emulsions containing silver halide-diamine complexes. Radiation-sensitive papers of the print-out type coated with such complexes are also disclosed. The complexes are represented by the formula $[(AgX)_2$ diamine$]$ wherein X is a halogen atom. Exemplary of such compounds are the following complexes: silver chloride-ethylenediamine $$[(AgCl)_2NH_2CH_2CH_2NH_2]$$

silver bromide-ethylenediamine $$[(AgBr)_2NH_2CH_2CH_2NH_2]$$

silver iodide-ethylenediamine $[(AgI)_2NH_2CH_2CH_2NH_2]$; silver chloride-propylenediamine $$[(AgCl)_2NH_2CH_2CH_2CH_2NH_2]$$

silver bromide-propylenediamine $$[(AgBr)_2NH_2CH_2CH_2CH_2NH_2]$$

silver iodide-propylenediamine $$[(AgI)_2NH_2CH_2CH_2CH_2NH_2]$$

Effective complexes include the silver halide-alkylene diamines such as silver halide-ethylenediamine, silver halide - propylenediamine, silver halide - tetramethylenediamine, silver halide-pentamethylenediamine, silver halide-hexamethylenediamine, etc.